United States Patent [19]

Sheets

[11] Patent Number: 4,960,157
[45] Date of Patent: Oct. 2, 1990

[54] BUSH AND TREE CUTTER

[76] Inventor: Kerney T. Sheets, P.O. Box 771, Duplessis, La. 70728

[21] Appl. No.: 265,720

[22] Filed: Nov. 1, 1988

[51] Int. Cl.⁵ .............................................. A01G 23/02
[52] U.S. Cl. .................................. 144/34 R; 30/379 S; 30/389; 56/295; 83/841; 144/34 A; 144/235; 144/241
[58] Field of Search ................. 144/3 D, 34 R, 34 A, 144/218, 176, 231, 235, 236; 83/835, 836, 839, 840, 841; 30/389; 56/295

[56] References Cited

U.S. PATENT DOCUMENTS

| | | | |
|---|---|---|---|
| 2,160,625 | 5/1939 | Thornton | 144/235 |
| 2,992,664 | 7/1961 | De Shano | 144/235 |
| 3,198,224 | 8/1965 | Hiley | 144/2 N |
| 3,343,575 | 9/1967 | Trout | 144/34 R |
| 3,704,801 | 12/1972 | Stair | 144/34 A |
| 3,797,544 | 3/1974 | Ver Ploeg | 144/235 |
| 3,818,957 | 6/1974 | Schoonover | 144/34 R |
| 4,175,902 | 11/1979 | Herzog et al. | 414/339 |
| 4,338,985 | 7/1982 | Smith et al. | 144/34 R |
| 4,593,733 | 6/1986 | Hamilton | 144/241 |
| 4,765,217 | 8/1988 | Ludwig | 83/841 |

OTHER PUBLICATIONS

"Stump Cutters", Vermeer Manufacturing Company.

Primary Examiner—W. Donald Bray
Attorney, Agent, or Firm—David L. Ray

[57] ABSTRACT

A method and apparatus for cutting trees and bushes including a circular disk having cutting teeth connected thereto, a motor for rotating the disk and an arm connected to the motor for moving the disk into contact with trees and bushes.

24 Claims, 2 Drawing Sheets

BUSH AND TREE CUTTER

BACKGROUND OF THE INVENTION

1. Field of the Invention

The present application is related to a device for cutting trees and bushes. More particularly, the present invention is related to a device for cutting trees and bushes which is mounted on a motor vehicle.

2. Description of the Related Art

Many tools are known in the art for cutting trees and bushes. Axes, machetes and various other metal blades having wooden handles connected thereto are used to cut small trees, large trees and bushes. Hand held saws such as cross-cut saws and bow-saws are also utilized to cut trees and bushes. Various motor driven saws such as chain saws and the like are also utilized in cutting trees and bushes and in clearing land.

Throughout the United States and in many other countries pipe lines are used to convey natural gas and other fluids from one geographic area to another. These pipe lines are commonly buried in the ground a few feet beneath the surface of the ground. It is necessary to keep the land and ground adjacent to the pipe line for certain specified distances on each side of the pipe line free of bushes and trees so that the pipe line may be visually observed periodically for fluid leaks, and to provide access to the pipe line for repairs if a problem with the pipe line arises, or if it is necessary to periodically perform maintenance work on the pipe line. The area adjacent to the pipe line which must be free of bushes and trees is frequently referred to as the pipe line right-of-way.

Utility companies that provide electrical energy to various consumers also must maintain the area beneath some of their electrical transmission lines free of trees and bushes. Furthermore, some telephone service companies must also keep the area beneath their telephone transmission lines which are supported by poles free of bush and trees.

After a right-of-way for pipe lines, electrical transmission lines, or telephone lines is initially cut through a wooded area of land, the right-of-way must be maintained relatively free of trees and bushes. Defoliant chemicals and plant poisoning chemicals have been commonly employed to prevent re-growth of trees and bushes on such right-of-ways. However, the poisons and defoliants frequently have an adverse effect upon plant, animal, marine, and aquatic life coming into the contact with the defoliant or poison.

In some areas of the United States, the use of plant poisons and defoliants has been restricted or eliminated due to the adverse effect upon plant, animal, marine and/or aquatic life. Some geographical areas with pipe lines in marshes and swamps having water in which the poisons and defoliants dissolve experience widespread adverse effects on plants, animals, and fish.

When a pipe line right-of-way is not regularly and periodically sprayed with poisons and defoliants, bushes grow large and trees also begin to grow to large heights and have trunks which are large in diameter. When overgrown right-of-ways having large trees and bushes are cleared, it is common to use a plurality of individual workmen using hand held motorized chain-saws, machetes and various types of hand held blades and axes for cutting bushes and trees from an existing right-of-way.

Commonly, the workmen leave many tree stumps and bush stumps protruding above the ground due to the difficulty of cutting trees and bushes close to the ground. Such stumps pose an impediment to workers and motor vehicles which must travel over the right-of-way after it is cut. The same procedure is employed when cutting new right-of-way through wooded areas of land.

Sometimes vehicles containing brush cutters known in the art as "bush hogs" are also employed for cutting bushes having trunks that are relatively small in diameter. The bush hog employs an elongated blade sharpened on opposite edges and rotated about its center axis by a motor. Bush hogs are employed for cutting bushes, but not for cutting trees or bushes having trunks larger than about 1½ inches in diameter or taller than about 10 feet.

In thickly wooded areas of land, and in particular in swamps having trees and bushes growing in shallow water, it is very difficult and dangerous for a workman to carry motorized chain-saws and other tree and bush cutting devices while walking and wading through water and thick woods. The workmen are sometimes exposed to dangerous animals and reptiles in swampy areas to be cleared such as snakes and alligators. Furthermore, there is danger of the workmen injuring themselves or others when employing tree and bush cutting blades, machetes and chain saws due to falling trees and striking themselves or other workmen with the cutting tools the workmen use.

SUMMARY OF THE INVENTION

In accordance with the present invention there is provided a method and apparatus for cutting trees and bushes including a thick circular disk having cutting teeth connected thereto, a motor for rotating the disk, and a movable arm connected to the motor for moving the disk into contact with trees and bushes.

The cutting apparatus of the invention can be connected to or mounted on tracked, floating motor vehicles known in the art as marsh and/or swamp buggies, or to rubber tired motor vehicles for moving the cutting apparatus over the land to be cleared. The cutting disk can be positioned parallel to the ground with the cutting disk in a horizontal position to quickly and efficiently cut through the trunks of bushes and trees. The cutting disk is thicker than a standard circular saw blade and is sufficiently rigid so that the cutting disk will not break when it is forced rapidly through a tree trunk or the trunk of a bush.

Furthermore, the cutting disk can cut trees and bushes at ground level thereby leaving a generally smooth level surface over which motor vehicles can travel without being damaged by tree and bush stumps. On flooded right-of-ways, the cutting blade can cut bush trunks and tree trunks below the surface of the water to prevent re-growth.

Furthermore, rigid members may be connected to the cutting apparatus for contacting trees and bushes being cut and forcing the trees and bushes away from the cutting apparatus and vehicle to which the cutting apparatus is connected.

Furthermore, the cutting disk of the present invention has a high moment of inertia and high rotational kinetic energy due to its high weight which helps maintain the angular velocity of the rotating blade or disk while rapidly cutting through the trunks of trees and bushes.

BRIEF DESCRIPTION OF THE DRAWINGS

The invention will be more fully understood by reference to the drawings in which.

DESCRIPTION OF THE PREFERRED EMBODIMENTS

Figure 1:
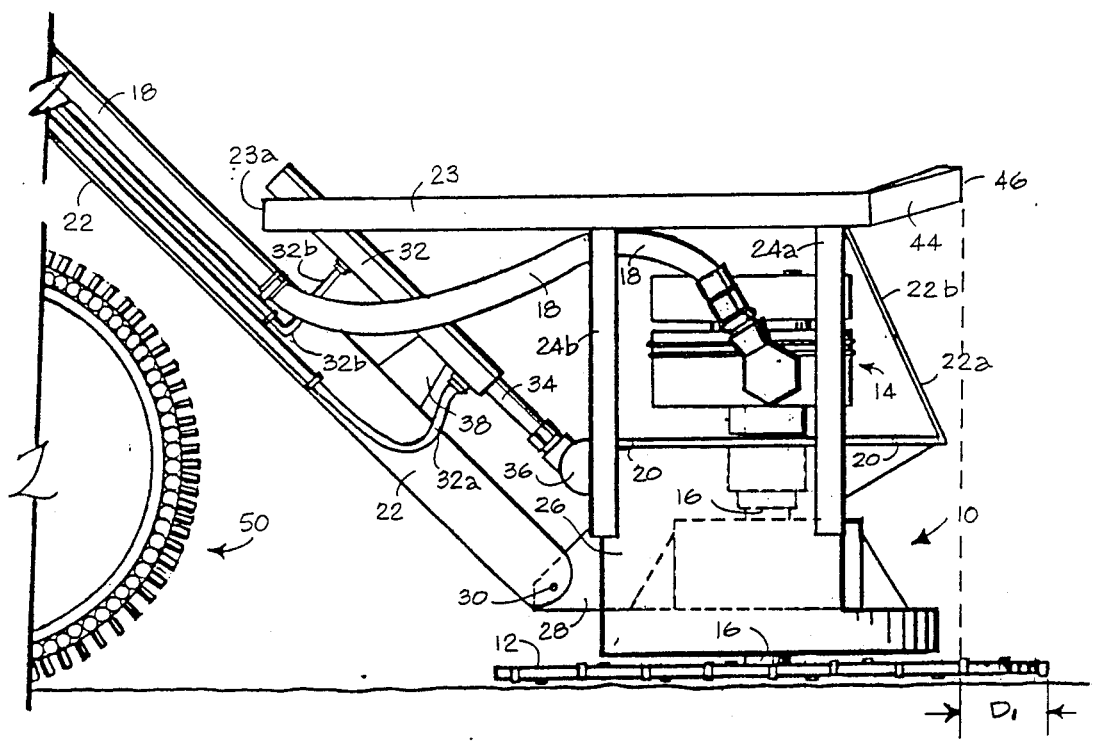
FIG. 1 is a partly cut-away elevational view of the bush and tree cutting apparatus of the invention and of the motor vehicle upon which the apparatus is mounted.
Figure 2:
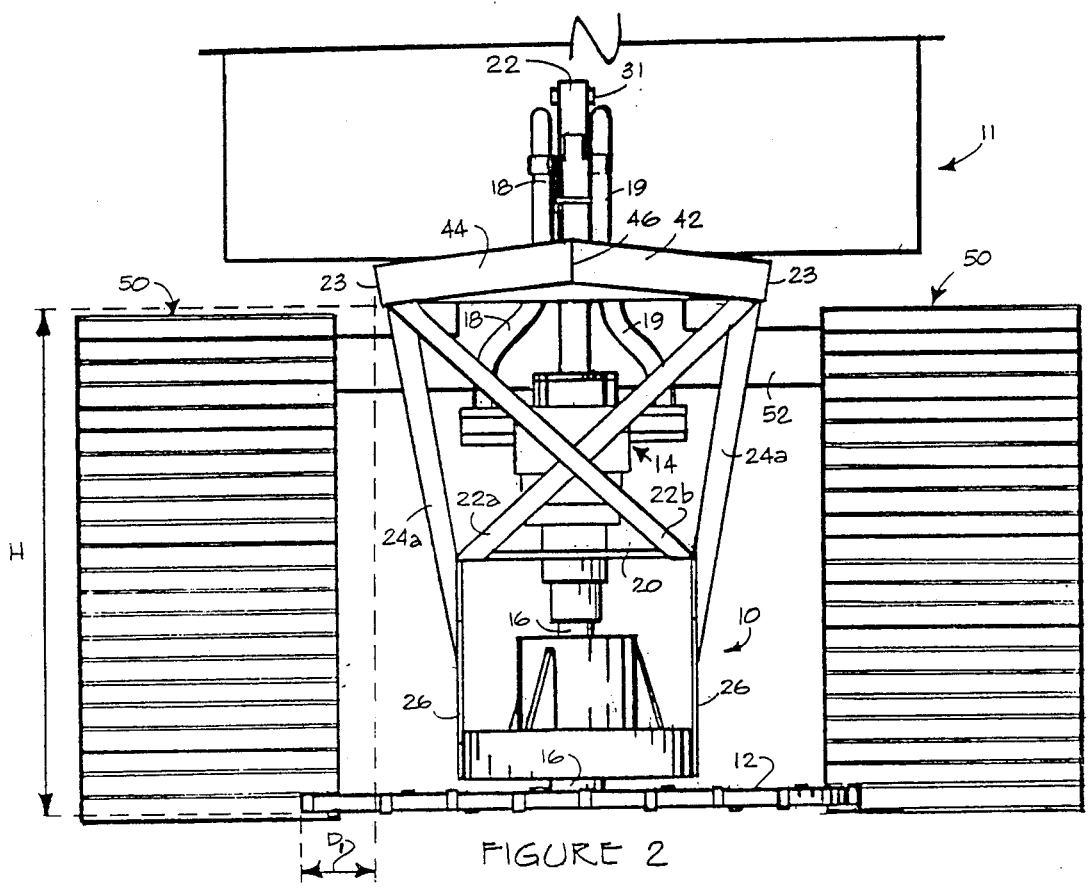
FIG. 2 is a front elevational view partly cut-away of the tree and bush cutting apparatus of the present invention and of the motor vehicle upon which it is mounted.

Referring now to the drawings, in FIGS. 1 and 2 the tree and bush cutting apparatus of the present invention is generally indicated by the numeral 10. The cutting apparatus of the invention includes a cutting blade or disk 12 which is connected to a conventional hydraulic motor generally indicated by the numeral 14 by a rotating shaft 16 which is driven by hydraulic motor 14. Although a hydraulic motor 14 is preferred, a conventional gasoline or diesel internal combustion engine or motor could be used in the place of hydraulic motor 14.

Hydraulic motor 14 has connected thereto hydraulic lines 18 and 19 which are in turn connected to a conventional hydraulic pump (not shown) driven by an internal or external combustion engine to supply hydraulic fluid to hydraulic motor 14 through line 18. After hydraulic fluid is circulated through hydraulic motor 14, the hydraulic fluid returns to the hydraulic pump (not shown) through line 19. Hydraulic motor 14 is any conventional hydraulic motor well known to those skilled in the art. Hydraulic motor 14 turns shaft 16 which is rigidly connected to the center of circular disk 12.

Hydraulic motor 14 is connected to plate 20 by bolting, welding or the like. Plate 20 is in turn rigidly connected to moveable arm 22 by support member 28, which is rotatably pinned to moveable arm 22 by pin 30. Plate 20 also has cross braces 22a and 22b rigidly connected thereto. Upwardly extending supports 24a—24a and 24b—≧b are rigidly connected to plates 26—26 and are rigidly connected to horizontal members 23—23 which terminate at their ends 23a—23a. Thus, support 28, which is rigidly connected to plate 26, can pivot about pin 30 and maintain cutting disk 12 horizontal to the ground when arm 22 is extended and retracted to and from motor vehicle 11. Cross braces 22a and 22b are rigidly connected to plate 20, and to each other, and to upwardly extending supports 24a—24a.

Arm 22 is rotatably pinned by pin 31 to another conventional moveable arm (not shown) rotatably connected to motor vehicle 11 such as arm 47 shown in U.S. Pat. No. 4,175,902, which is hereby incorporated by reference. Thus, arm 22 and cutting disk 12 can be moved toward and away from motor vehicle 11, and moVed from side to side to cut trees and bushes.

The entire cutter 10 can pivot about pin 30 on arm 22 by actuation of hydraulic cylinder 32 having hydraulic piston 34 pivotally connected to members 24 at pivot 36 to maintain cutting disk 12 parallel to the ground. Hydraulic cylinder 32 is rigidly connected to arm 22 by support 38, and has hydraulic fluid supply line 32a and hydraulic fluid return line 32b connected to a conventional hydraulic pump (not shown) mounted on motor vehicle 11. Thus, when hydraulic cylinder 32 is actuated to push piston 34 outwardly, the horizontal position of cutting disk 12 can be maintained even though arm 22 lowers disk 12 to the ground or raises disk 12 above the ground. Horizontal member 23 extend outwardly toward the outer edge of disk 12 a horizontal distance D as indicated in FIGS. 1 and 2. After disk 12 cuts into a tree or bush trunk or distance D, horizontal member 23 or front bars 42 and 44 strikes the trunk and begins forcing the tree or bush away in the direction horizontal member 23 or front bars 42 and 44a moving. Distance D is preferably about four inches to about two feet, more preferably about six inches to about 10 inches.

Preferably, horizontal members 23 are located a distance H shown in FIG. 2 to force trees and bushes to one side as cutting disk 12 is cutting the tree or bush. Preferably H is about two to ten feet, more preferably about three to eight feet, most preferably about four to six feet.

Thus, horizontal members 23 contact the trunk of a tree when disk 12 is being moved to the side of motor vehicle 11 to push a tree over as disk 12 is cutting through the tree or bush. Connecting horizontal members 23 are upper front bars 42 and 44 which form a point 46. Bars 42 and 44 are used to deflect trees and bushes to the side of the cutting apparatus 10 and motor vehicle 11 when cutting disk 12 is cutting a tree or bush in the front of the motor vehicle 11.

Tracked motor vehicle 11 contains the necessary internal or external combustion engines to operate and drive the motor vehicle and to operate the hydraulic pumps associated with hydraulic motor 14 and hydraulic cylinder 32. Motor vehicle 11 has tracks 50 thereon supported by cross member 52 and can be any conventional marsh buggy or swamp buggy or the like. Tracked vehicle 48 could of course be replaced by a rubber tired vehicle having a boom on the back which can be moved upwardly and downwardly, away from and toward the vehicle, and from side to side of the vehicle as the boom does which is shown in U.S. Pat. No. 4,175,902. Thus, the vehicle 11 which supports the arm 22 allows the arm to be turned in an arc in the front of the vehicle 11 as the vehicle 11 is being advanced forwardly.

Figure 3:
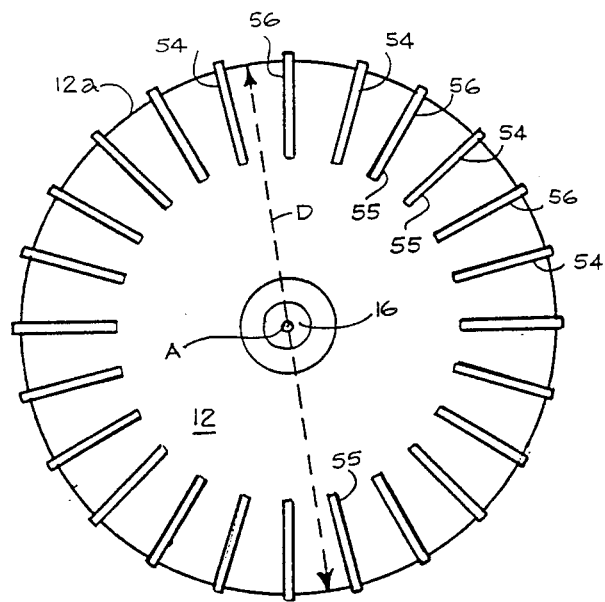
FIG. 3 is a top view of the cutting disk of the present invention.
Figure 4:
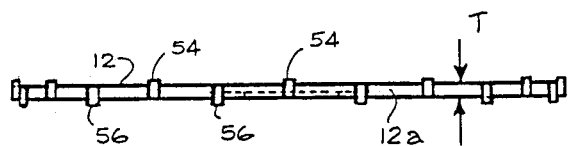
FIG. 4 is a side or edge view of the cutting disk of the present invention.

Referring now to FIGS. 3 and 4, the cutting disk 12 of the present invention is preferably a solid cylinder having a length or thickness T indicated by the arrows in FIG. 4 and a diameter D shown in FIG. 3 ranging from about 10 inches to about 60 inches. Preferably the diameter of disk 12 ranges from about 15 inches to about 48 inches. More preferably, the diameter of the blade ranges from about 24 to about 36 inches.

As can be seen in the drawings the disk 12 has a plurality of teeth 54 and 56 which are adjacent to each other, extend outwardly from disk 12, and are staggered or set so that the path or "road" cut through a tree trunk or bush trunk is greater than the thickness T of blade 12. It is preferred that the cutting teeth 12 are staggered or set in such an arrangement to prevent the disk 12 from dragging, binding, or rubbing a tree trunk or bush trunk being cut by disk 12. The teeth 54 and 56 preferably extend about ½ inch to about one inch from the edge 12a of disk 12.

The cutting teeth 54 and 56 can be attached to blade 12 by any means well known in the art. Preferably slots 55 corresponding to the size of the teeth are cut into disk 12 and the cutting teeth 54 and 56 are welded to the disk 12. The cutting teeth 54 and 56 can be tipped with any hardened metal to retard wear and extend the life of the teeth such as tungsten-carbide as is well known in the art. Such tips prevent the teeth from wearing rapidly.

It is important that the cutting disk 12 of the present invention be sufficiently strong and rigid to prevent bending or breaking of the blade as the cutting disk 12 is rapidly cutting through a tree. Preferably, the cutting disk is made from carbon containing steel having a unit weight or density of about 489 to 491 pounds per cubic foot and a tensile strength of about 60,000 to about 200,000 pounds per square inch, more preferably, about 100,000 to 150,000 pounds per square inch.

It is also preferred that the steel from which the cutting disk 12 is made be hard and abrasion resistant. Preferably, the Grinnell hardness number ranges from about 200 to about 370, more preferably, about 230 to about 360.

Furthermore, it is preferred that the cutting disk 12 have a high moment of inertia and rotational kinetic energy so that as the disk 12 is being moved rapidly into contact with a tree, the rotational kinetic energy of the cutting disk 12 allows the disk to quickly cut through the tree or bush with a very small decrease in the rotational speed or angular velocity of the disk 12.

Preferably, the moment of inertia of the cutting disks 12 of the present invention range from about 10 pounds-feet squared (hereinafter lb. ft$^2$) to about 2000 lb. ft$^2$, more preferably from about 15 lb. ft$^2$ to about 800 lb. ft$^2$, and most preferably about 40 lb. ft$^2$ to about 250 lb. ft$^2$. The moment of inertia for the cutting disk is calculated in accordance with the following formula $$I = \tfrac{1}{2} WR^2$$

where I = moment of inertia, W = weight of disk 12 in pounds, and R = the radius of disk 12 in feet.

Preferably the cutting disk 12 of the present invention weighs from about 16 pounds to about 700 pounds. More preferably cutting disk 12 weighs from about 50 to about 400 pounds. Even more preferably, cutting disk 12 weighs from about 75 pounds to about 225 pounds.

It is preferred that the blade be in the shape of solid cylinder. It is preferred that the thickness T, shown by the arrows in FIG. 4, of the disk 12 varies from 5/16 inch to about one inch. More preferably, the thickness T of the disk 12 should be about 7/16 inch to about ¾ inch. The most preferred thickness T is about ¾ inch thick.

Preferably, when disk 12 is cutting trees and bushes, the disk 12 is rotated about its central axis A shown in FIG. 3 at an angular speed of from approximately 500 revolutions per minute (hereinafter RPM) to about 4000 RPM. More preferably, the blade is operated from about 1000 RPM to about 3000 RPM. Most preferably, the disk 12 is operated from about 1500 to 2000 RPM.

EXAMPLE I

In accordance with the present invention a disk 12 was manufactured from T-1 steel in the shape of a solid cylinder having a diameter of 24 inches and a thickness T of ¾ inches. The disk was a solid cylinder having parallel sides and the shape or cross-section of a circle. A shaft was connected to the cutting disk at its center. The weight of the disk including connected teeth was 97 pounds. The teeth were welded in slots 55 cut in the disk and had tungsten carbide tips. When the disk was supported at its edges and a five inch diameter weight was placed in the center thereof weighting 196.3 pounds, the center of the disk deflected or moved downwardly from its previous position a distance of 0.0025 inches. When a force of 2016 pounds was placed over same five inch diameter circle in the center of the blade, the blade deflected, 0.025 inches.

The disk was mounted on a tracked vehicle and connected to a motor 14 and arm 22 as previous described. Distance D was four inches. The disk was operated at angular speed up to about 2000 RPM. The disk 12 and cutting assembly 10 rapidly cleared a right-of-way of bushes and trees having trunks of up to ten inches in diameter.

EXAMPLE II

To compare the disk of Example I with a conventional saw blade, a 24 inch in diameter conventional saw blade was weighed and found to weigh 13½ pounds. The conventional saw blade had 3/16 inch uniform thickness. Upon applying a four pound weight five inches in diameter in the center of the saw blade while supporting the saw blade its edges, the blade was found to deflect 0.002 inches. When a nineteen pound weight was placed over a five inch diameter circle in the center of the saw blade the saw blade deflected 0.025 inches.

It can thus be seen that the cutting disk 12 of the present invention is much heavier and more rigid than a conventional saw blade. Therefore the cutting disk of the invention will not break as easy and will have a much higher kinetic energy which permits the blade of present invention to cut quickly through a tree. The blade of the present invention is much stronger, and harder than a conventional saw blade and will rapidly and easily cut through large tree trunks.

Although the preferred embodiments of the present invention have been disclosed and described in detail above, it should be understood that the invention is in no sense limited thereby, and its scope is to be determined by that of the following claims.

What is claimed is:

1. An apparatus for cutting trees and bushes comprising:
   a. a circular steel cutting disk having a smooth top side and a smooth bottom side, said disk having cutting teeth connected to the periphery thereof, said disk having a thickness of at least 5/16 inches,
   b. motor means connected to the top of said disk for rotating said disk about an axis at the center of said disk perpendicular to the side of said disk, and
   c. moveable arm means connected to said motor means for moving said disk into contact with said trees and bushes.

2. The apparatus of claim 1 wherein said top side is parallel to said bottom side.

3. The apparatus of claim 1 wherein said disk is rigid.

4. The apparatus of claim 1 wherein said disk is rotated at least 500 RPM.

5. The apparatus of claim 1 wherein said disk is a solid cylinder having a diameter of at least 10 inches.

6. The apparatus of claim 1 wherein said disk has a diameter of at least 18 inches.

7. The apparatus of claim 1 wherein said arm means is connected to a motor vehicle.

8. The apparatus of claim 1 wherein said arm means can move said disk in all directions parallel to the ground.

9. The apparatus of claim 1 wherein said disk has a moment of inertia of at least about 15 lb. ft$^2$.

10. The apparatus of claim 1 wherein said disk has a moment of inertia of at least 40 lb. ft$^2$.

11. The apparatus of claim 1 wherein said disk has a moment of inertia of from about 40 to about 250 lb. ft$^2$.

12. The apparatus of claim 1 wherein said disk is made from steel having a tensile strength of at least 60,000 pounds per square inch.

13. The apparatus of claim 1 wherein said disk has a Grinnell hardness number of at least about 200.

14. The apparatus of claim 1 wherein said disk has the shape of a solid cylinder.

15. The apparatus of claim 1 wherein said disk weighs at least about 50 pounds.

16. The apparatus of claim 1 wherein said disk weighs from about 75 to about 225 pounds.

17. The apparatus of claim 1 wherein said motor means has striking means connected thereto for contacting said trees and bushes above said cutting disk to force said trees and bushes away from said cutting disk.

18. The apparatus of claim 17 wherein said distance ranges from about two to about 10 feet.

19. The apparatus of claim 17 wherein said cutting disk contacts said trees and bushes before said striking means contacts said trees and bushes.

20. The apparatus of claim 1 wherein said arm means aligns said disk parallel to the ground.

21. A method for cutting trees and bushes comprising:
   a. orienting a cutting disk having a top said and a bottom side, said top side and said bottom side being smooth, said cutting disk having cutting teeth in the periphery thereof, said cutting disk being at least 5/16 inch thick, said cutting disk having a moment of inertia of at least 10 lb. feet,
   b. rotating said disk, and
   c. moving said rotating cutting disk into trees and bushes to cut said trees and bushes.

22. The method of claim 21 wherein said disk is rotated from about 1000 RPM to about 3000 RPM.

23. The method of claim 21 wherein said disk is connected to a motor vehicle.

24. The method of claim 21 wherein said cutting disk has a moment of inertia of at least 40 lb. ft$^2$.

* * * * *